United States Patent
Stone

(10) Patent No.: US 7,256,227 B2
(45) Date of Patent: *Aug. 14, 2007

(54) POLYMER MODIFIED GYPSUM MEMBRANE AND USES THEREFOR

(75) Inventor: William Ivor Stone, Ludlow (GB)

(73) Assignee: Rohm and Hass Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/300,521

(22) Filed: Nov. 20, 2002

(65) Prior Publication Data

US 2003/0105202 A1 Jun. 5, 2003

(51) Int. Cl.
C04B 24/26 (2006.01)

(52) U.S. Cl. ................ 524/5; 523/130; 524/4

(58) Field of Classification Search ........... 524/2–8; 523/130
See application file for complete search history.

(56) References Cited

U.S. PATENT DOCUMENTS

| | | | | |
|---|---|---|---|---|
| 2,986,544 | A * | 5/1961 | Driscoll | 524/524 |
| 3,607,817 | A * | 9/1971 | Trapasso et al. | 524/235 |
| 3,947,398 | A | 3/1976 | Williams | 260/29.6 |
| 3,970,501 | A * | 7/1976 | Miyamoto et al. | 156/305 |
| 4,157,264 | A | 6/1979 | Kennedy-Skipton | 106/111 |
| 4,197,219 | A | 4/1980 | Damico | 524/462 |
| 4,218,285 | A * | 8/1980 | Durr et al. | 162/106 |
| 4,291,115 | A * | 9/1981 | Chambers | 430/271.1 |
| 4,309,469 | A * | 1/1982 | Varona | 428/74 |
| 4,353,745 | A * | 10/1982 | Ebbeler | 106/2 |
| 4,604,347 | A * | 8/1986 | Arai et al. | 435/4 |
| 4,661,161 | A | 4/1987 | Jakacki et al. | 106/112 |
| 4,762,744 | A * | 8/1988 | Woiceshyn et al. | 428/219 |
| 4,804,688 | A | 2/1989 | Vassileff | 521/64 |
| 4,827,924 | A * | 5/1989 | Japuntich | 128/206.12 |
| 4,828,650 | A * | 5/1989 | Wagle et al. | 162/168.1 |
| 4,863,781 | A * | 9/1989 | Kronzer | 428/200 |
| 4,887,097 | A * | 12/1989 | Akiya et al. | 347/105 |
| 5,134,017 | A * | 7/1992 | Baldwin et al. | 428/194 |
| 5,210,117 | A * | 5/1993 | Lee et al. | 524/28 |
| 5,242,888 | A * | 9/1993 | Atherton et al. | 503/227 |
| 5,275,927 | A * | 1/1994 | Pham et al. | 430/536 |
| 5,653,797 | A * | 8/1997 | Patel | 106/781 |
| 5,683,816 | A * | 11/1997 | Goodreau | 428/461 |
| 5,746,822 | A | 5/1998 | Espinoza et al. | 106/785 |
| 5,763,083 | A * | 6/1998 | Berrigan | 428/402 |
| 5,908,619 | A * | 6/1999 | Scholz | 424/78.02 |
| 6,054,514 | A * | 4/2000 | Kulkarni | 524/111 |
| 6,488,872 | B1 * | 12/2002 | Beebe et al. | 264/31 |
| 6,652,961 | B2 * | 11/2003 | Sargeant et al. | 428/336 |
| 6,689,934 | B2 * | 2/2004 | Dodge et al. | 604/367 |
| 6,720,028 | B1 * | 4/2004 | Haaland | 427/133 |
| 6,720,387 | B1 * | 4/2004 | Stark et al. | 525/203 |
| 2004/0055511 | A1 * | 3/2004 | Clamen et al. | 106/778 |

FOREIGN PATENT DOCUMENTS

| | | |
|---|---|---|
| EP | 0562 651 A1 | 9/1993 |
| EP | 1054 046 A2 | 5/2000 |
| GB | 2003 851 A | 3/1979 |
| WO | WO 99/48833 | 9/1999 |
| WO | WO 99/48833 A2 | 9/1999 |
| WO | WO 99/48833 A3 | 9/1999 |

OTHER PUBLICATIONS

The Condenses Chemical Dictionary, Tenth Edition, Gessner G. Hawley, p. 1082.*
Grant & Hackh's Chemical Dictionary, Fifth Edition, Roger Grant and Claire Grant, p. 619.*

* cited by examiner

*Primary Examiner*—Peter Szekely
(74) *Attorney, Agent, or Firm*—Leah M. Reimer; Kim R. Jessum

(57) ABSTRACT

A composition which is applied to substrate surfaces to form a membrane to provide structural reinforcement thereto and prevent the release of gases and moisture from the substrate. The composition consists of polymer resin binders and gypsum. Further provided is a method for dividing the composition into two separate components in order to preclude premature setting up of the composition ingredients until applied to the substrate. The present invention is particularly useful for creating membranes on the exposed surfaces of newly excavated rocks in subterranean mine systems. The composition may also be used in the construction industry as coatings for sandwich panels, molding, duct-work, piping and cladding systems. It also is useful in traffic paint applications and other transportation industry safety coatings. In addition, the invention may be used in the manufacture of fiber reinforced composite structures and composite construction components.

22 Claims, No Drawings

POLYMER MODIFIED GYPSUM MEMBRANE AND USES THEREFOR

CROSS REFERENCE TO RELATED PATENT APPLICATIONS

This is a non-provisional application of prior pending U.K. provisional application no. 0128658.2 filed Nov. 30, 2001.

This invention relates to a composition containing a polymer component and gypsum and its utility as a membrane coating on various target substrates. It is useful in the construction industry as coatings for sandwich panels, molding, duct-work, piping and cladding systems. It also is useful in traffic paint applications and other transportation industry safety coatings. It is of particular value, though, as a semi-impervious reinforcing membrane on the internal surfaces of subterranean mines. Further, this invention provides a method for applying the novel composition to rapidly set up on these substrate surfaces. In addition, the invention may be used in the manufacture of fiber reinforced composite structures and composite construction components, for example laminated panels for use in cladding. Although the description below relates primarily to the use of the invention as a reinforcing membrane for use in subterranean mines, the invention is not limited to such applications and may be used in, for example, any of the applications mentioned hereinbefore.

Particular problems exist in underground mining operations for coal, gold, platinum and the like in which it is necessary to provide support to the wall and ceiling surfaces of the mine shafts as soon after excavation as possible. This is because the recently excavated rock facing may be susceptible to cracking and spalling. If exposed for too long a period of time, rock fragments will begin to fall away from the wall and ceiling surfaces of the newly excavated rocks. This presents an obvious hazard to both mining personnel and machinery.

An additional problem that must be addressed by any coating membrane is the prevention of gas exchange, such as methane, from the newly exposed rock surfaces. The spread of such gases throughout the mining tunnel system can pose serious health threats to the mining personnel. Further, any coating must be virtually impervious to moisture, thus setting up a barrier between the excavated rock and the internal mine environment.

Mine tunnel systems are made up of different areas. The main access tunnels tend to be much larger than regions referred to as "stopes". Stopes are the primary excavation areas of the mine. It is advantageous to apply a coating membrane to both areas. Each area, however, presents its own unique problems.

Conventional coatings in the main access areas are cementitious. These coatings require large equipment to perform the application process. They are often used in these areas because of the adequate amount of room available to accommodate heavy application equipment. One type of cementitious coating is referred to as "shotcrete". As disclosed in U.S. Pat. No. 4,046,357, shotcrete is a slurry made up of Portland cement which is sprayed under pressure onto the internal surfaces of the larger access areas. The problems with use of these types of coatings are that the application process is very messy, creating "splash back" and excessive dripping. Further, these coatings often take a long time to set up, from 15 minutes to over four hours. This time frame, coupled with the need to clean up from the messy application process, may require shutting down the recently coated area to vehicular traffic or other activities, thus adversely affecting productivity.

These types of heavy cementitious coatings have proven to be unacceptable in the stope regions of the mine because these regions are very confining with ceiling heights sometimes no greater than 1.2 to 1.5 meters. Lighter weight resin systems, which can be applied with lighter weight and smaller equipment are preferable. Polyesters and polyurethanes had been tried and had shown some promise but are now widely banned in mining operations due to safety and health concerns. They tend to generate toxic fumes upon curing and exhibit poor resistance to flammability. Neither of these results are desirable in a closed environment such as a subterranean mine system.

Gypsum formulations have been widely used for mining operations. Gypsum is inexpensive but it has its drawbacks. For example, gypsum forms a notoriously poor moisture barrier. Resistance to moisture seeping out of the excavated rock is important in mining operations. If moisture is allowed to seep into the mine shafts and tunnels, at the very least, it will create a very unpleasant working environment for the miners, and in the worst case, will cause erosion or pooling on walkways or roadbeds, requiring constant preventative or rehabilitative maintenance. Organic polymer resins have been blended with gypsum materials with the objective of resolving this problem. However, such systems have always been designed around using gypsum as the primary film forming barrier. The addition of polymer resins as a secondary, non-continuous barrier only reduces severity of moisture permeability. Also, as with shotcrete, due to the difficulty in applying a heavy gypsum based coating onto the internal surfaces of such a confining work environment as the stope regions of a mine, this type of coating is undesirable here, as well.

As a result of the difficulties attendant with the use of gypsum or cement based coatings, coupled with the current ban on polyester and polyurethane coatings, there has existed for some time a need for a non-toxic, moisture and gas impermeable coating which may be applied with light weight equipment and which will set very rapidly upon contact with excavated rock surfaces. The present invention presents a viable solution to these problems.

The present invention provides a composition which comprises, as its primary ingredients, a polymer resin and gypsum. The polymer resin is in the form of an aqueous emulsion. The composition is prepared in two separate components, one containing a resin and the gypsum and a set retarder to prevent the premature setting of the gypsum. The second component contains a different resin, a filler and a set activator, which, when combined with the first component, will initiate the setting of the gypsum.

The composition may be supplied to the work site in two components, one consisting primarily of the polymer resin and the other containing the gypsum. The two components are applied to the target surface either separately or immediately after being blended where they rapidly react to form a quick setting membrane.

One aspect of the invention is a composition containing components A and B, wherein component A comprises:
gypsum,
an alkaline aqueous dispersion of a polymer resin,
a set retarder, and component B comprises:
an aqueous dispersion of polymer resin,
a filler, and a set activator.

A second aspect of the invention is a method for applying a membrane coating onto a substrate surface. This method is particularly well suited for application onto the newly excavated surfaces of a subterranean mine system. During application, components A and B are applied at a volume ratio of from 7 to 3, respectively, to 3 to 7. The optimum ratio may be determined by considering factors such as the surface to be treated, the time required for cure and other processing concerns.

A third aspect of the invention is a membrane which forms on the surface of a substrate comprising a continuous polymeric resin film and cured gypsum. Even though the membrane is very thin, it is substantially impervious to gas and moisture seepage out of the substrate. The membrane may be from 0.1 to 10 mm thick, depending on the working environment and application conditions.

Application is most conveniently done by use of pressurized spray applicators. Component A and component B may be fed via separate hose or duct systems to either a single or dual applicator nozzles, where both are sprayed either simultaneously, as through dual nozzles, or as a blend, via a single nozzle, onto the target excavated rock surface. By applying pre-determined volumes of components A and B, the person performing the task of applying the membrane is not left with the task of trying to calibrate the amounts of both components being sprayed so as to optimize cure times and coating thicknesses. This optimization has already been determined prior to formulating and delivering components A and B to the work site.

At the moment components A and B are combined, the activator from component B will initiate the setting of the gypsum from component A. Since it is originally in a hemi-hydrate state, as it sets, the gypsum will require water. The gypsum rapidly withdraws water from the polymer resins, which are in an emulsified state. This then causes the polymers to "film over" the surface of the substrate. It is this polymeric film that provides resistance to the escape of gases and moisture from the newly exposed rock surface.

The membrane formed by the application of the present composition provides excellent resistance to the exchange of gases, such as methane, which might leach out from the newly exposed rock. Further, it provides a coating which is substantially impervious to moisture. The present composition readily adheres to various substrates, especially newly excavated subterranean rock, which helps to reinforce the exposed facing of these rocks so as to prevent fragments from "calving" off and falling onto either mining personnel or their equipment.

An additional advantage associated with this invention relates to its ease of handling. It is possible to eliminate measuring or the addition of ingredients at the point of use. Since the two components, A and B, are applied at pre-determined rates, the application equipment may be relatively simple in design. Components A and B may be mixed off site and transported to the work site in closed containers. Although various application techniques may be used, it may be preferable to use a spray applicator, especially if the target substrate is the recently excavated rock surface of a subterranean mine. Once at the point of use, the two components may then be fed into spray equipment and sprayed together onto the surface to be treated. The blended components will then set up very rapidly to form a membrane on the rock surface.

The membrane coating thickness may vary as conditions warrant, but generally, they range from 0.1 to 10 mm. The preferred thickness is in the range of 0.5 to 5 mm and most preferably from 1 to 2 mm. The novel polymer/gypsum composition of the present invention will set up quickly on the treated rock surface. A final membrane coating thickness in the range of 1 to 2 mm will set up in less than 3 minutes and most probably in approximately 1 minute.

The polymer resins useful in this invention are primarily derived from polymers of ethylenically unsaturated monomers and include vinyl resins and polymers of acrylates and methacrylates. Examples include methyl acrylate, butyl acrylate, ethyl acrylate, methyl methacrylate, ethyl methacrylate, butyl methacrylate, hexyl methacrylate and lauryl methacrylate. Other polymer resins which may be used are styrene, vinyl acetate, vinyl versatate and vinyl chloride. Copolymers of two or more of these classes of monomers can be employed as desired depending on the properties required in the final membrane composition. The term "copolymer" as used herein is intended to include polymer blends as well as true copolymers. An example of a suitable alkaline copolymer emulsion is AC339, which is an acrylate polymer, available from the Rohm and Haas Co. of Philadelphia, Pa. as an alkaline emulsion. An example of a suitable acidic copolymer emulsions is HA16, also available from Rohm and Haas, which is an acrylate/acrylamide copolymer supplied as an acidic emulsion.

When selecting monomers or monomer blends for use in the composition of the invention, it is necessary to keep in mind the various properties of each monomer. For example, polystyrene is alkali-resistant and water resistant, but its long term aging properties are not very good. For some applications, this negative feature may be an acceptable accommodation. Polyvinylacetate has low water resistance but in certain applications, e.g., when the composition is applied to a subterranean surface which is substantially devoid of moisture, this may be acceptable. The acrylate and methacrylate resins have good long term aging properties and good water and alkali resistance, but they may require flow additives to improve their flow characteristics. For applications where having good flow characteristics is not an issue, the choice of this resin is not a problem and may in fact be desired based on the many other valuable properties exhibited by the acrylate class of resins. The amount of polymer resin present in either component A or component B is from 20-99 parts, based on the total weight of the respective component.

One of the properties which should be considered in the choice of a polymer is the "glass transition temperature" or "Tg". The glass transition temperature of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat versus temperature transition as the Tg value. A typical heating rate for the DSC measurement is 20° C./minute. The Tg of various homopolymers may be found, for example in Polymer Handbook, edited by J. Brandrup and E. H. Immergut, Interscience Publishers. The Tg of a polymer is calculated using the Fox equation (T. G. Fox, Bull. Am. Physics Soc., Vol. 1, Issue No. 3, page 123, 1956).

The preferred Tg for the polymer resin is in the range of −20° to 50° C., with the most preferred range being from 0° to 40° C. As for the examples cited earlier, the Tg of AC339 is 26° C. and for HA16 it is 35° C.

The pH of the polymer dispersion is important in that it affects the stability of the formulation. Specifically, in order for the gypsum to remain stable and not set up after being formulated but before use, the specific polymer binder must be alkaline. Thus, the polymer formulated into component A must be in the form of an alkaline dispersion. The pH of the polymer dispersion in component B is not as critical since it does not come into contact with the gypsum until the two components are blended with the intent of causing the gypsum to set up. This polymer dispersion may be either acidic or alkaline. However, it may be preferable to use an acidic polymer dispersion since, once components A and B are blended, the resulting blend will have a final pH in the neutral range, thus avoiding any potentially negative consequences from the formation of a membrane either too acidic or too alkaline.

The polymer resin may be emulsified or it may be in the form of a water redispersible powder. While either system may work in the operation of the present invention, it may be commercially more feasible to utilize emulsified polymer resins. Emulsions which are formulated for the composition of the invention may contain about 35 to 65% solids, preferably 45 to 55%, by volume. The concentration used will, of course, depend on the characteristics required in the final membrane coating and the speed of cure. However, since the continuous phase of the membrane formed consists of a polymer film and not a gypsum film, a high polymer loading is necessary to achieve the objectives of the invention.

Numerous emulsion processes are known in the art. While any of these may be employed to create the specific polymer resin emulsions of the invention, reference is directed to "The Fundamental Principles of Polymerization" by D'Alelio (Wiley, pub., 1952) and "Principles of Polymer Chemistry" by R. J. Flory (Cornell University Press, pub., 1969) as indicative of suitable polymerization techniques.

The gypsum used in this invention may comprise a wide variety of settable forms of calcium sulphate which may include anhydrous calcium sulphate and/or chemical gypsum, commonly called synthetic gypsum, as well as calcium sulphate hemihydrate.

There are primarily two types of hemihydrate ($CaSO_4 * 1/2H_2O$) which are commercially available and conventionally referred to as the alpha and beta forms. The alpha hemihydrate is conventionally prepared by placing lump gypsum into an autoclave and calcining it at controlled superatmospheric pressure in the presence of steam. In contrast, beta hemihydrate is prepared by heating the dihydrate at atmospheric pressure in either a kettle or rotary calciner. Although the physical appearances of these two types of gypsum may be the same, they differ in the water/gypsum ratio required to produce workable products. The dissimilarity in the physical nature of the gypsum particles of the two forms arises from the differences in their respective surface properties. The larger alpha crystals have low water absorption and smaller surface area per unit weight. This translates into a lower water requirement to cause setting up, or curing, of the gypsum. The lower the weight of water in proportion to the weight of dry gypsum solids, the greater the strength of the final product after curing. The amount of gypsum used in the formulation of component A is from 50 to 80 parts, based on the total weight of component A. Preferably, 60-70 parts is used.

The composition of the invention contains a hydration inhibitor to prevent the setting of the gypsum. It is incorporated into the "A" component in an amount of from 0.1 to 2.0 parts, based on the total weight of component A. The hydration inhibitor is a polymer or copolymer of a polycarboxylic acid. Examples include acrylic acid, methacrylic acid, itaconic acid and fumaric acid. Copolymers of acrylic acid or methacrylic acid and an alkyl ester of acrylic acid or methacrylic acid, or esters thereof, such as methyl acrylate, or polycarboxylic acid anhydrides are preferred hydration inhibitors. The polymeric inhibitor may conveniently be in the form of the sodium or ammonium salt. A preferred hydration inhibiting copolymer may contain from about 50 to 99.9 percent acrylic acid and about 0.1 to about 50 percent acrylamide, by weight. More preferably, the copolymer consists of about 95 to 98 percent acrylamide, by weight, and about 1 to 5 percent, by weight, of acrylic acid. Examples of suitable hydration inhibitors are Acumer 9141, sold by the Rohm and Haas Co., Philadelphia, Pa. and Coatex TP-30.

An activator is included in the "B" component so that upon intermixing with the "A" component, setting of the gypsum will be initiated. This then leads to the formation of a polymer resin film on the targeted substrate. The amount of activator required will be based on the amount of alpha gypsum and hydration inhibitor present in the composition. The activator will preferably be added in an amount of from 0.1 to 6.0 weight percent, and more preferably from 0.1 to 4.0 weight percent, based on the weight of the solids content of component B. Suitable activators include metallic salts which can provide acidic cations. Preferable metallic salts are aluminum sulfate, calcium sulfate, ferric sulfate, zinc sulfate and ferric chloride. The most preferred activator for this composition is aluminum sulfate.

A filler may be used in the present composition to provide bulk to the formulation. Examples of suitable fillers are sand, mica, silica aluminate and fly ash. A low density fly ash is commercially available as "Hollowfill". The filler is best added to component B and may be present in an amount of 30-50%, by weight. Preferably, filler may be added in an amount of 35-45%, by weight.

The composition of the invention will now be described by example. It should be understood that other ingredients are added to the composition in order to aid processing, handling or formulating. Ingredients which are traditionally utilized in coatings include anti-foamers, surfactants, rheology modifiers, set control agents, coalescing agents and expansion agents.

Legend: Ingredients

| | |
|---|---|
| Alkaline aqueous dispersion: | AC339: acrylic latex emulsion; Rohm and Haas Co. |
| Antifoam: | S882, Wacker Silicones |
| Surfactant: | X405/70, Triton |
| Expansion agent: | Potassium Hydrogen Tartarate |
| Coalescing agent: | Butyl Carbitol |
| Set control agent: | Sodium citrate |
| Rheology Modifier: | RM 2020: acrylic polymer: Rohm and Haas Co. |
| Hydration Inhibitor: | TP-30; polycarboxylate; Coatex Corp. |
| Acidic aqueous dispersion: | HA16: acrylic/acrylate polymer; Rohm and Haas |
| Activator: | Aluminum sulphate |
| Gypsum: | Alpha hemi-hydrate |
| Filler: | Millisil C-7; aluminum silicate |

EXAMPLE

Component A (pre-mix)

| ingredient | parts by weight |
|---|---|
| alkaline aqueous dispersion | 93.94 |
| antifoam | 1.00 |
| surfactant | 1.75 |
| rheology modifier | .11 |
| hydration inhibitor | 1.35 |
| excess water | 1.86 |
| total | 100.00 |

Formulated Component A

| | |
|---|---|
| gypsum | 69.23 |
| pre-mix (A) | 30.77 |
| total | 100.00 |
| pH | 8.4 |
| solids | 83.8% |
| density | 1.84 |

Component B (pre-mix)

| ingredient | parts by weight |
|---|---|
| acidic aqueous dispersion | 57.18 |
| defoamer | .57 |
| expansion control | .56 |
| coalescing agent | 1.50 |
| activator | 2.79 |
| filler | 143.0 |
| excess water | 2.79 |
| total | 208.40 |
| pH | 2.7 |
| solids | 83.4% |
| density | 1.82 |

FORMULATION

| | ratio by volume | ratio by weight |
|---|---|---|
| Component A | 1 | 50.17 |
| Component B | 1 | 49.83 |

APPLICATION

Components A and B are then transported to the point of use in separate containers. The method of application is via spray application. Appropriate spray applicators may be acquired from the Sagola Co. in Spain. The container holding the aqueous dispersion of component A is attached to one of the feed systems. Similarly, the container holding the aqueous dispersion of component B is attached to another feed system. Both components A and B are combined in equal volumes inside the spray applicator immediately prior to application. The blended solution is then sprayed onto a rock surface at 30 psi.

RESULTS

| | |
|---|---|
| set time: | 1 minute |
| thickness: | 2 mm |
| moisture permeability | low |
| gas exchange | low |

The invention claimed is:

1. A composition comprising component A and component B;
wherein component A comprises:
a settable gypsum,
an alkaline aqueous dispersion of an acrylic polymer, and
a hydration inhibitor, and
wherein component B comprises:
another aqueous dispersion of an acrylic polymer
a filler, and
an activator.

2. The composition of claim 1 wherein the volume ratio of component A to component B is from, and including, 7 to 3 to, and including, 3 to 7.

3. The composition of claim 1 wherein the acrylic polymers comprise units derived from at least one of methyl acrylate, butyl acrylate, ethyl acrylate, methyl methacrylate, ethyl methacrylate, butyl methacrylate, hexyl methacrylate, lauryl methacrylate, or a combination comprising at least one of the foregoing acrylates.

4. The composition of claim 1 wherein the hydration inhibitor is an aqueous polycarboxylate.

5. The composition of claim 1 wherein the activator is selected from the group consisting of aluminum sulfate, potassium sulfate, calcium sulfate, ferric sulfate, zinc sulfate and ferric chloride.

6. The composition of claim 5 wherein the activator is aluminum sulfate.

7. The composition of claim 1 wherein the gypsum is calcium sulfate hemihydrate.

8. The composition of claim 7 wherein the calcium sulfate hemihydrate is alpha hemihydrate.

9. The composition of claim 1 wherein the amounts, by weight, of the ingredients of component A are: 20-99 parts alkaline aqueous dispersion; 50-80 parts gypsum and 0.1-2.0 parts hydration inhibitor, based on the total weight of Component A.

10. The composition of claim 1 wherein the amounts of the ingredients of component B are: 20-99 parts acrylic polymer dispersion, 30-50 parts filler and 0.1-6.0 parts activator, based on the total weight of component B.

11. A method of forming a membrane onto a substrate comprising applying to said substrate the composition of claim 1.

12. The method of claim 11 wherein the substrate is an excavated rock surface of a subterranean mine.

13. The method of claim 11 wherein the volume ratio of A:B is from 7:3 to 3:7.

14. The method of claim 11 wherein the components A and B are blended immediately prior to being applied to the substrate by means of a pressurized spray applicator.

15. The method of claim 11 wherein the thickness of the membrane is from 0.1 mm to 10 mm.

16. A membrane formed on the surface of a substrate comprising the composition of claim 1.

17. The membrane of claim 16 wherein the substrate is a rock surface of a subterranean mine.

18. The membrane of claim 16 wherein the thickness of the membrane is from 0.1 to 10 mm.

19. The membrane of claim 18 wherein the thickness of the membrane is from 0.5 to 5.0 mm.

20. The membrane of claim 16 wherein the continuous polymeric resin film and gypsum are formed by applying onto the surface of the substrate the composition of claim 1.

21. A composition comprising component A and component B;
   wherein component A comprises:
      a settable gypsum,
      an alkaline aqueous dispersion of an acrylic polymer, and
      a hydration inhibitor; and
   wherein component B comprises:
      another acidic aqueous dispersion of an acrylic polymer, and
      an activator.

22. The composition of claim 21 wherein the acrylic polymer resins each have a Tg of $-20°$ to $50°$ C.

* * * * *